(12) United States Patent
Camps et al.

(10) Patent No.: US 7,783,972 B2
(45) Date of Patent: Aug. 24, 2010

(54) ENSURED WORKFLOW SYSTEM AND METHOD FOR EDITING A CONSOLIDATED FILE

(75) Inventors: Peter Camps, Drongen (BE); David van Driessche, Gentbrugge (BE)

(73) Assignee: Enfocus NV, Ghent (BE)

( * ) Notice: Subject to any disclaimer, the term of this patent is extended or adjusted under 35 U.S.C. 154(b) by 1517 days.

(21) Appl. No.: 10/041,525

(22) Filed: Jan. 8, 2002

(65) Prior Publication Data

US 2002/0116399 A1 Aug. 22, 2002

Related U.S. Application Data

(60) Provisional application No. 60/260,230, filed on Jan. 8, 2001.

(51) Int. Cl.
*G06F 17/24* (2006.01)
*G06F 17/30* (2006.01)

(52) U.S. Cl. .................. 715/255; 715/230; 715/232; 715/233; 715/229

(58) Field of Classification Search .................. 715/522, 715/527, 515, 511, 209, 230, 232, 233, 229
See application file for complete search history.

(56) References Cited

U.S. PATENT DOCUMENTS

| | | | |
|---|---|---|---|
| 5,889,932 A | | 3/1999 | Adegeest et al. |
| 5,963,641 A | | 10/1999 | Crandall et al. |
| 5,978,475 A | * | 11/1999 | Schneier et al. ............. 713/177 |
| 5,999,945 A | * | 12/1999 | Lahey et al. ................ 707/200 |
| 6,026,416 A | * | 2/2000 | Kanerva et al. ............. 715/208 |
| 6,052,198 A | * | 4/2000 | Neuhard et al. ............ 358/1.15 |
| 6,078,690 A | * | 6/2000 | Yamada et al. .............. 382/233 |
| 6,182,080 B1 | * | 1/2001 | Clements .................... 707/102 |
| 6,297,891 B1 | | 10/2001 | Kara .......................... 358/405 |

(Continued)

OTHER PUBLICATIONS

Person, "Special Edition Using Microsoft Excel 97", Publisher: Que, pp. 1-4.*
Job Definition Format (JDF) white paper, Mar. 14, 2000 (8 pp.).
JFD Specification Documents, Jan. 3, 2002 (2 pp.).
JDF Specification Draft Spiral 5.0 by CIP4 Organization (451 pp.).
Markzware FlightCheck® Classic User Manual, 2001 (78 pp).
Enfocus PitStop Professional User Guide, 2000 (168 pp).

*Primary Examiner*—Stephen S Hong
*Assistant Examiner*—Wilson Tsui
(74) *Attorney, Agent, or Firm*—RatnerPrestia

(57) ABSTRACT

An ensured workflow system for editing a consolidated file, such as a portable document formatted (PDF) file, which may be in the form of a plug-in application that communicates with a host application through an application program interface. The system comprises means for storing identifying information in association with the consolidated document indicating that the document was edited using the system, and means for storing edit information relating to each editing session. The edit information includes at least a listing of one or more edits made during the session, user information relating to the user who conducted the edit, and any comments entered by the user relating to the session. The system may also comprise means for storing native application information identifying one or more native application format documents from which the consolidated document was created and/or means for storing a preflight profile to be used for preflighting the document and means for preflighting the edited document in accordance with the preflight profile.

33 Claims, 5 Drawing Sheets

U.S. PATENT DOCUMENTS

| | | | |
|---|---|---|---|
| 6,407,820 B1 * | 6/2002 | Hansen et al. | 358/1.12 |
| 6,608,697 B1 * | 8/2003 | Schorr et al. | 358/1.15 |
| 6,674,540 B1 * | 1/2004 | Wiechers et al. | 358/1.15 |
| 7,003,723 B1 * | 2/2006 | Kremer et al. | 715/517 |
| 2002/0022984 A1 * | 2/2002 | Daniel et al. | 705/8 |
| 2002/0120648 A1 * | 8/2002 | Ball et al. | 707/511 |

* cited by examiner

ENSURED WORKFLOW SYSTEM AND METHOD FOR EDITING A CONSOLIDATED FILE

CROSS-REFERENCE TO RELATED APPLICATIONS

This application claims the benefit of U.S. Provisional Application No. 60/260,230 filed Jan. 8, 2001, the entirety of which is incorporated herein by reference.

TECHNICAL FIELD

The present invention relates, in general, to a method of editing an electronic data file. More particularly, this invention provides a computer application for providing an ensured workflow with respect to the editing of a consolidated file, such as a PDF file.

BACKGROUND OF THE INVENTION

With the proliferation of electronic file processing and digital graphic art design, the publishing industry has migrated away from traditional mechanical layout/pressing systems toward electronic-based publishing/pressing workflow systems. Prior to the use of electronic publishing workflows, publishers/printers were responsible for integrating content components (i.e., images, text, etc.) into a consolidated document for printing. Thus, the scanning of images, color reproduction, layout, and associated formatting were performed by the traditional printer or pre-press house. As electronic publishing workflow systems have become increasingly commonplace in order to work with contemporary electronic content creators and graphic artists, printing and publishing entities have lost the ability to standardize the preparation and editing of content components necessary for controlling the production/layout process.

Presently, electronic publishing workflows are subject to inconsistent content component standards and corresponding consolidated electronic file translations. For example, component files such as image and text files are produced by a variety of applications. These component files are then integrated into a page format or "consolidated file" such as a PDF, TIFF, XML, and/or POSTSCRIPT® formatted file. The consolidated file converts component files (i.e., raster and/or vector based) into a single format for acceptance by an output processing system. In order to provide an acceptable consolidated file, attributes such as font handling, color handling, resolution, target output device, and compression must be determined in advance, and may be different for the consolidated file than for the component files. Moreover, in order to edit the consolidated file components, it is often necessary to recreate the original file components and/or change the consolidated file type.

By way of example, as shown in FIG. 1, a diagram representing a generic electronic publishing workflow edit chain is shown having four stages A-D. Typical workflow edit chains may be simpler or more complex, however, than what is shown and described herein. The workflow or "edit chain" of FIG. 1 begins in Stage A, which is the document creation level, where a document originator creates the original document in a "native" application such as MICROSOFT WORD™, QUARK XPRES® or ADOBE INDESIGN®. This original document is referred to herein as the Native Application File (NAF1). The document originator then creates a first PDF document (PDF1) from NAF1, such as through a direct export from the native application through a host application, or by printing to a distiller.

At Stage B, the document originator may apply a preflight profile received from a service provider, such as a printing service bureau, and may initiate an edit session for the purpose of preflighting PDF1. Preflighting, as is known in the art, is an output system compliance analysis step that compares the document to a set of rules, such as formatting rules, printability rules, and the like, relating to the specific output device used for creating the document in its final physical or electronic form, for example. PDF1 may optionally be edited, creating one or more intermediate files (PDF2$a,b,c$ . . . ) that may be individually saved and preflighted, resulting in a document (PDF3) that is sent to the service provider. Although preflighting by document originators is a growing practice, this step is not always performed. Even when preflighting is done early in the edit chain, the service provider and/or printer cannot currently ensure that the preflight was in fact performed, or that the correct preflight profile was used.

The service provider, such as a pre-press house, then receives document (PDF3), which may or may not be preflighted, from document originator in Stage C. The service provider may perform a preflight step, which may be an initial preflight step or a verification that the preflight step performed by the document originator. The service provider may also make a series of edits and subsequent preflights, creating one or more intermediate documents (PDF 4$a,b,c$ . . . ). The service provider may make edits, for example, to correct problems identified by preflight reports, add printability marks, make last-minute corrections, and the like. The final document created by the service provider (PDF5) then passes to Stage D, where it is handled by the printer or electronic publisher. Stage D comprises the actual printing step, which may first include a preflighting step to verify that the file conforms to the printing requirements before creation of the final published document (PD), such as a physically printed document, or electronically published documents such as a document posted to an Internet website or incorporated into a CD-ROM. It should be noted that Stages B and C are optional, and that in some cases a document originator may merely give the native application filed (NAF1) to the printer, who creates the PDF, preflights it, and prints it. Because there is no way to tell if a document has been preflighted at all or preflighted using the correct profile, even if the document originator has properly preflighted the document, the service provider and printer typically duplicate the effort.

As can be appreciated, propagation of the component and consolidated files through the edit chain of the electronic workflow system necessarily demands that changes be made by a variety of operators interactively or automatically (without user intervention) in the workflow. Thus, to increase the effectiveness of correction tools in any stage of a PDF workflow, it is desirable to address two issues: document consistency and editing responsibility. While it is most efficient to make corrections immediately as they are identified, "late stage editing" in PDF creates an inconsistency between the final document and the native application document. Furthermore, the native application document may be modified without the modifications being transferred to the final document. Job reruns may require duplication of approved corrections and result in added risk. With a digital workflow lacking the signed proofs of a non-digital workflow, there is no easy way to preserve the job at various approval stages, making it difficult to pinpoint the origin of an error or modification after the fact. Thus, it is desirable to provide a system that can identify when, where, and by whom changes in a document have been made.

Accordingly, there is a need for a PDF editing and workflow management system in which efficiency is increased by encouraging preflighting at an early stage in the workflow and by securing a specific file at a known point in the workflow to eliminate unidentified tampering. Furthermore, it is desirable to provide a system that can ensure that a document complies with a specific preflight profile without the need to duplicate the preflighting step at each stop in the edit chain.

SUMMARY OF THE INVENTION

One aspect of the invention is an ensured workflow system for editing a consolidated document in one or more editing sessions in which one or more users edit and save successive versions of the consolidated document. At a minimum, one embodiment of the system comprises means for storing information in association with the consolidated document indicating that the document was edited using the ensured workflow system; and means for storing edit information in association with the consolidated document relating to each editing session. The edit information comprises a listing of one or more edits made during the session, user information relating to the user who conducted the edit, comment data entered by the user relating to the session, and preflight results, if any. The system may further comprise means for storing and verifying a preflight profile in association with the consolidated document to be used for preflighting the document and means for preflighting the edited document in accordance with the preflight profile. In such case, the means for storing the edit information may further comprise means for storing one or more preflight results related to any preflight step that was performed. In another embodiment, the system may comprise only a system for ensuring that a consolidated document has been preflighted with a correct preflight profile.

The system may further comprise means for storing information in association with the consolidated document identifying one or more native application format documents from which the consolidated document was created. In a preferred embodiment, the system comprises all of the above means. It should be noted that even where the system comprises such means, in one embodiment, the user may have the option of not using the means for storing native application information, means for storing preflight information, means for preflighting, or a combination thereof with respect to any given document. In other embodiments, the user may be required to use one or more of such means with respect to each document. The system may not necessarily include all of the above means. In one embodiment, the system comprises means for storing preflight information in association with the consolidated document, the system comprising means for storing preflight information identifying a preflight profile and parameters thereof to be used for preflighting the document; means for conducting a preflighting operation on the edited document in accordance with the preflight profile; and means for storing one or more results of the preflighting operation in association with the consolidated document.

A preferred embodiment may have one or more of the following attributes. The consolidated document may comprise a portable document format (PDF) file. The system may comprise a plug-in application for use with a host application that enables viewing and creation of PDF files and that has an application program interface (API) for integrating the functionality of the plug-in application. The system may comprise means for detecting edits that were not made by the system. The system may comprise means for displaying the listing of one or more edits made during the session in an edit log. The system may comprise means for displaying a history of editing sessions for the edited file and means for comparing a first document version saved after a first session with a second document version saved after a second session. The system may comprise means for saving a snapshot of a previous document version saved after a selected editing session. The system may comprise means for reviewing an identifier of the preflight profile associated with the document, reviewing whether the preflight profile associated with the document matches a database preflight profile, reviewing whether the document has been preflighted with the preflight profile, and reviewing whether the preflight report contains any errors.

Another aspect of the invention is a method for verifying responsibility for edits made to a consolidated document in one or more editing sessions in which one or more users edit and save successive versions of the consolidated document using an ensured workflow software program. The method comprises the steps of (a) storing information in association with the consolidated document indicating that the document was edited using the ensured workflow software package; (b) storing edit information in association with the consolidated document relating to each editing session, the edit information comprising: a listing of one or more edits made during the session, user information relating to the user who conducted the edit, and comment data entered by the user relating to the session. The method may further comprise (c) identifying a preflight profile in association with the consolidated document to be used for preflighting the document; and (d) preflighting the edited document in accordance with the preflight profile; wherein storing the edit information in step (b) further comprises one or more preflight results related to the preflighting step. The method may also further comprise (e) storing information in association with the consolidated document identifying one or more native application format documents from which the consolidated document was created. Another aspect of the invention comprises a computer readable carrier including computer program instructions that cause a computer to implement the method described above.

Both the foregoing general description of the invention and the following detailed description are exemplary, but are not restrictive, of the invention.

BRIEF DESCRIPTION OF THE DRAWING

The invention is best understood from the following detailed description when read in conjunction with the accompanying drawings.

DETAILED DESCRIPTION OF THE INVENTION

Figure 1:
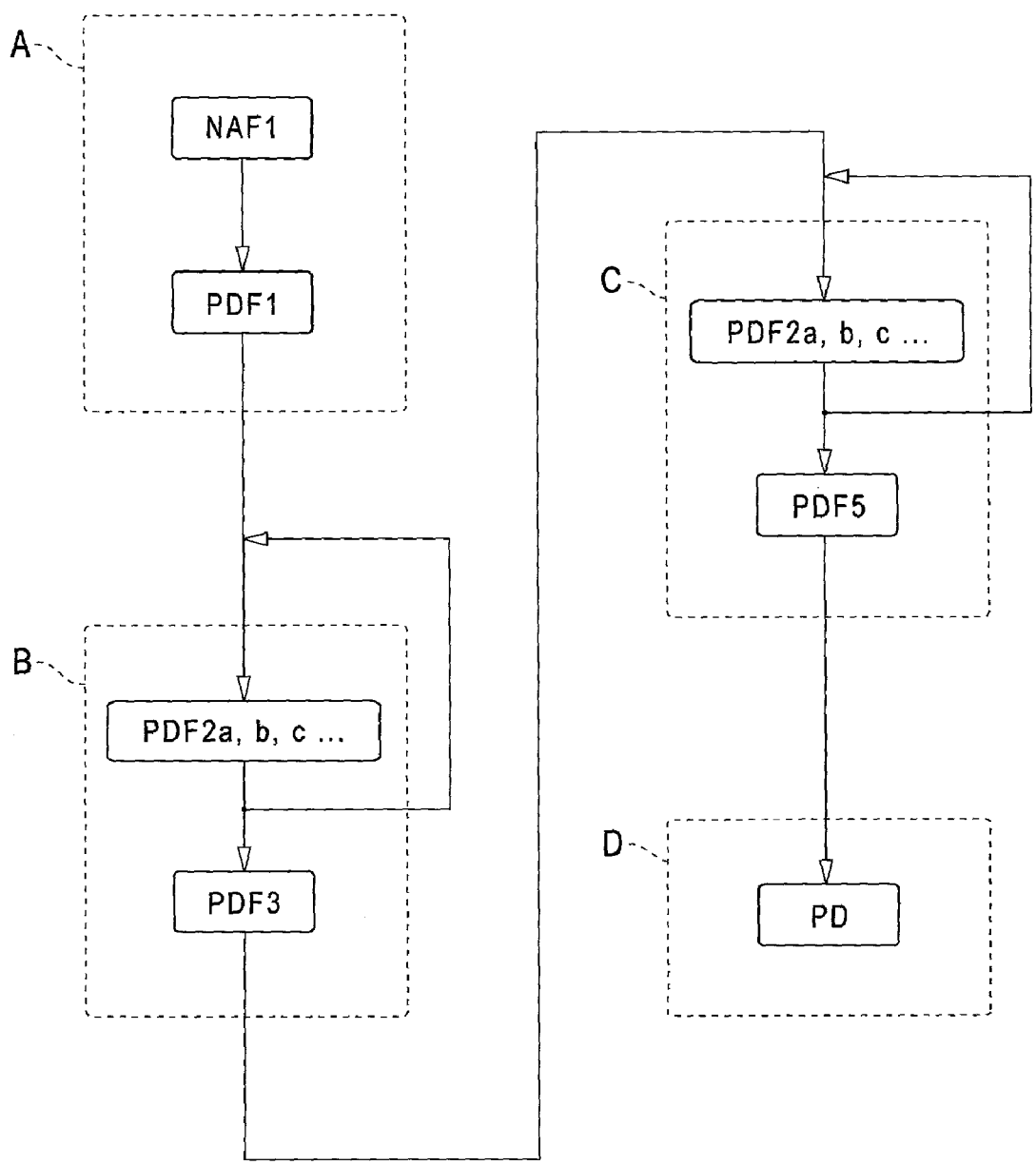
FIG. 1 is a diagram of a typical electronic workflow edit chain known in the art.

In the drawings, the same reference numerals are used for designating the same elements throughout the several figures.

The following glossary is provided as a reference of common terms known in the art. The definitions listed below are provided to facilitate the disclosure of an exemplary embodiment of the invention. The definitions are provided as general concepts rather than precise definitions, and thus should not be interpreted as limitations on the invention. The terminology includes words noted below as well as derivatives thereof and words of similar import. The terms are generally defined as follows:

- Component File: A distinct element, such as a graphic or text object to be incorporated into a document for publishing by a workflow system.
- Consolidated File: A file for storing component files in a common format that is accepted by an output processing system, such as but not limited to a PDF file, a POSTSCRIPT® file, a tagged interface format file (TIFF) file, or an extensible markup language (XML) file.
- Distiller: Application that interprets POSTSCRIPT® data and builds a PDF file.
- Editing Session: An operation beginning with accessing or "opening" a document or "file" and ending when the file is saved.
- Host Application: An application having an Application Program Interface (API) for communication with a Plug-In Application (e.g., ADOBE ACROBAT®).
- Native Document: An original document in a format prior to conversion to a consolidated file (e.g., a MICROSOFT WORD™ document)
- PDF file: Portable Document Format file—a type of consolidated file.
- Plug-In Application: An application communicating with a host application through an Application Program Interface (API).
- Preflighting: The process of verifying that a document has the necessary elements and formats to perform as desired in the workflow so that problems can be identified prior to a final publication step (i.e. printing, posting on a website, incorporating it into a CD-Rom, etc.). Although the terms "preflight" or "preflighting" may have a particularized connotation in the graphic arts field, the use of these terms herein relates to any validation or verification step of the document against any set of rules for governing the document, and does not imply a limitation only to traditional preflighting specific to graphic arts applications.
- Proof: An output of a document prior to full-scale publishing to verify the desired format, appearance, layout, and the like.
- Snapshot: A view of a consolidated file at some previous point in the workflow at a moment when the file had been saved.
- Stage: A session or series of sessions ending in a preflighting and saving step, such as the handling of the consolidated file by one department or organization.
- Stamp: A tag applied to a document or file at the time of saving, that provides identifying information (i.e. the date and time, the operator, etc.).

I. System Overview

The present invention provides an ensured workflow system for improving consistency and accountability in the editing of electronic publishing documents. The ensured workflow system may be in the form of a plug-in application for use with a host application, a stand-alone application, or a library program, such as a Dynamic Link Library (DLL) usable by other programs to enable files created by that program to interface with the ensured workflow system.

In an exemplary embodiment, the computer platform may be any type of platform known in the art, including but not limited to a personal computer, such as a desktop, laptop, or portable device, having access to a memory for storing operational data of the ensured workflow system, such as the desired preflight profile parameters described herein. A graphical user interface, such as supported by MICROSOFT WINDOWS 2000™ may be used for generating standardized "screens" and/or templates to interactively manage and/or operate the ensured workflow system of the present invention. The invention is not limited to any specific type of graphical user interface, however, nor even limited to a graphical interface. Furthermore, the invention is not limited to use with any particular computer operating system.

The ensured workflow system of the present invention functions to "ensure" the edit chain of FIG. 1. From the creation of a consolidated document, such as a PDF document, in Stage A until the final output in Stage D, the active version of the document can be retrieved and compared to previous versions of the document and/or component files to determine where an error or specific correction or alteration was introduced. The ensured workflow system provides an edit log and "compared" versions between the first and last PDF in the ensured workflow to enable the document originator to accurately update his native application file.

Generally, the ensured workflow system of the exemplary embodiment provides a means for viewing the PDF document at any given point along the edit chain where the file has been "saved" in order to determine where an error was introduced. By preflighting and saving a document, the edit chain of FIG. 1 can be validated at every stage, resulting in an ensured workflow. As such, the ensured workflow system of the present invention provides a way to identify if a file has been modified since it was last preflighted, in order to detect errors or inconsistencies from one edit to the next. Also, the ensured workflow system preferably provides means for storing a preflight profile associated with the document, and means for verifying that a similarly-named preflight profile on the user's computer has identical parameters to the stored profile.

Once a file has entered the ensured workflow system of the present invention, further actions on the file may follow the ensured guidelines of the application by default. The user interface of the exemplary computer platform enables a user to initiate the ensured workflow system at any time, even in the middle of a workflow that has not previously been ensured. In the exemplary embodiment, changes made to a file outside the ensured workflow system are detected. Changes made to a file subject to the ensured process are logged. Where the system comprises a plug-in application, the file is preferably editable at all times by the host application, and also by other available plug-in applications. Where the system comprises a library application, the file is preferably editable at all times by the system hosting the library application, and by any other form of the system, such as a stand-alone or plug-in application. All information concerning the ensured workflow is preferably contained in the PDF document itself without additional supporting files and without a substantial increase in the size of the PDF file.

II. Description of an Exemplary Embodiment

An exemplary method in accordance with the present invention will now be more specifically described for demonstrating the functionality of the ensured workflow system.

A. Plug-In Application

Although not limited to a plug-in application, the exemplary embodiment is described herein with respect to a plug-in application. For such an application, the host application typically has an application program interface (API) for integrating the functionality of the plug-in application. A plug-in application enable users familiar with a specific host application the ability to enhance the functionality of the host application without the need to become familiar with a completely new application. The plug-in application and host application need not reside in a common memory. For example, the application program interface of the host application may be interfaced remotely by the plug-in application, such as where the host application resides on a network server. Similarly, the plug-in application may interface with a "stand-alone" host application being executed as a background process, as is known in the art. In an exemplary ensured workflow system, each user who handles the document has access to and uses a version of the host application having the plug-in of the present invention for editing and saving that document.

The host application and plug-in application together provide a cooperative functionality for enabling a method of interactively managing and operating an ensured workflow system. In the exemplary embodiment, the host application is a consolidated file viewer that may include limited editing functionality. The plug-in application may provide further editing features, in addition to ensured workflow functionality in accordance with the present invention.

The host application referred to in the exemplary embodiment comprises ADOBE ACROBAT®, which enables viewing and creation of PDF formatted files. Those skilled in the art will recognize, however, that the system and associated methods of the present invention, while described in conjunction with PDF documents, are equally applicable to other known consolidated document formats. It should also be understood that other host applications exist and that the present invention is not limited to any particular host application. The ensured workflow system of the exemplary embodiment may employ additional plug-in applications for providing additional functionality, such as preflight libraries and similar applications, for example as employed by PITSTOP PROFESSIONAL™ of Enfocus Software of Gent, Belgium.

B. User Interface

The exemplary ensured workflow system integrates the additional functionality of the plug-in application to the menus and toolbars of the host application. For example, the ensured workflow system may provide an extra tool button on the command bar (the bar which is by default displayed at the top of the screen) of host application, may provide an "Ensured Workflow" menu on the host application menu bar, and may provide a preference menu in a standard location for preferences on the host application.

In the exemplary embodiment, the tool button may have a differently colored and/or shaped icon depending on the document that is currently active to give feedback on the current state of the document in the ensured workflow system. Such document states may include, for example: unensured, ensured status "green," and ensured status "red." Ensured status "green" may mean that the active document is an ensured document, that the document has been successfully preflighted without errors, and that the preflighting profile matches a profile in the profile database, if applicable. Ensured status "red" may mean that the active document is an ensured document, but there is some problem preventing it from being considered as status "green." Although the set of tool button colors may be any set of colors, in a preferred embodiment, the color of the tool button for status "red" may be red, for status "green" it may be green, and for the unensured states it may be a color that blends with the remaining buttons on the toolbar so that a user not using the ensured workflow system for that document is not distracted.

The action executed when the operator actuates the tool button differs for each of these button "states." For example, for a document in the unensured state, activating the ensured workflow tool button may bring up a "start ensured workflow" window. In the status "green" or status "red" states, activating the tool button may bring up a window showing the document status.

The Ensured Workflow Menu may be used for initiating and managing an ensured workflow. Although depicted and described herein with respect to a graphical user interface (GUI) supporting mouse-click selection of menu choices, those skilled in the art will recognize that the menu may be executed manually (i.e., in a non-GUI environment) by a keyboard device, through "shortcut keys" and "hot-keys." Each menu item may relate to a specific function that may be performed by the present invention. Such functions may include, starting the ensured workflow, editing the ensured workflow attributes, preflighting and saving, showing the document status, showing a preflight report, showing the document history, showing the user identification, and verifying the original document. The menu may be designed to make visible (and/or selectable) only menu items relevant to the document status. For example, a menu item enabling the user to start the ensured workflow may be displayed if the active document is not an ensured document, whereas a menu item enabling the user to edit the ensured workflow attributes may be displayed if the document is an ensured document.

Figure 2A:
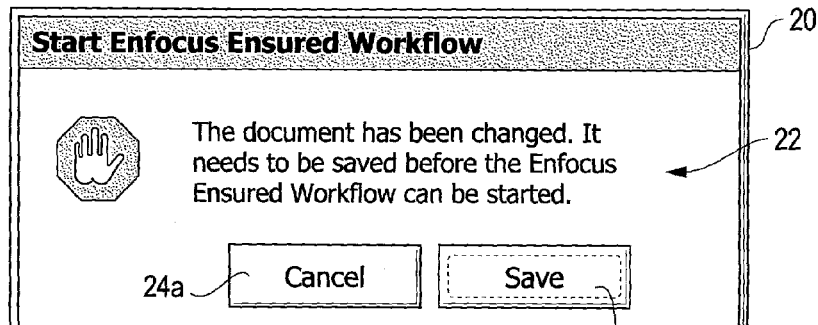
FIG. 2A depicts an exemplary pop-up dialog display window of the type used in an exemplary embodiment of the present invention.
Figure 2B:
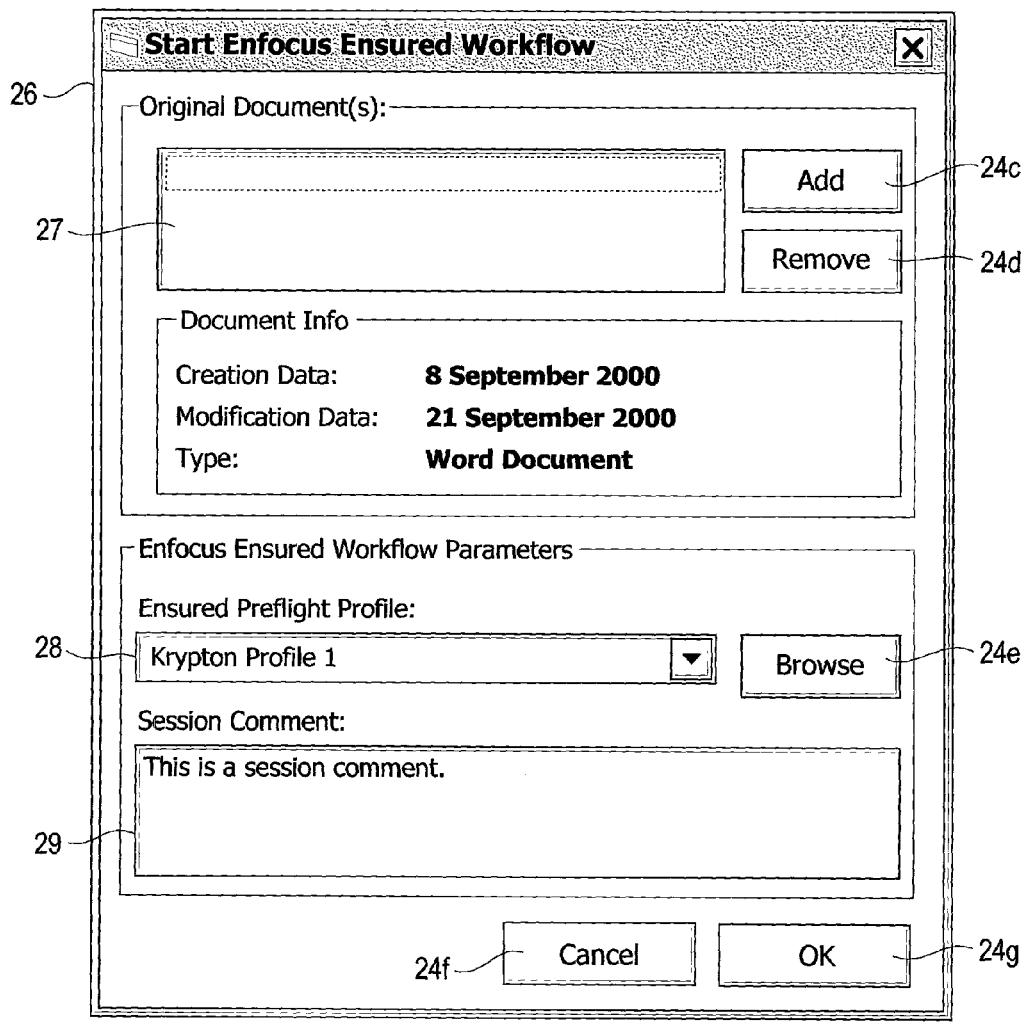
FIG. 2B depicts an exemplary pop-up interactive display window of the type used in an exemplary embodiment of the present invention.

Referring now to FIGS. 2A and 2B, there are shown exemplary pop-up window screen displays of the type that may be used in conjunction with the present invention. Pop-up window 20 shown in FIG. 2A is a "dialog window" that displays information 22 and requires a response from the user, in the form of choosing buttons 24a or 24b in response to the information. Pop-up window 26 shown in FIG. 2B is an "interactive window" that provides an add/remove data field 27 where the user can add or remove one or more items (in this case original document files) using corresponding buttons 24c or 24d; a browse data field 28 where the user can look for one or more items on a preselected list (in this case a list of preflight profile files) by choosing corresponding button 24e; and a comment data field 29 where the user can add comment text to be saved. Buttons 24f and 24g allow the user to cancel entry of the information, or OK entry of the information, respectively. It should be recognized that dialog windows can have more than two choices, and that interactive windows may contain any one or more of the data field types shown in FIG. 2B, as well as additional types of data fields not shown. The exemplary window types are merely shown for further reference to window types generally later herein.

C. Basic Ensured Workflow Methodology

Figure 3:
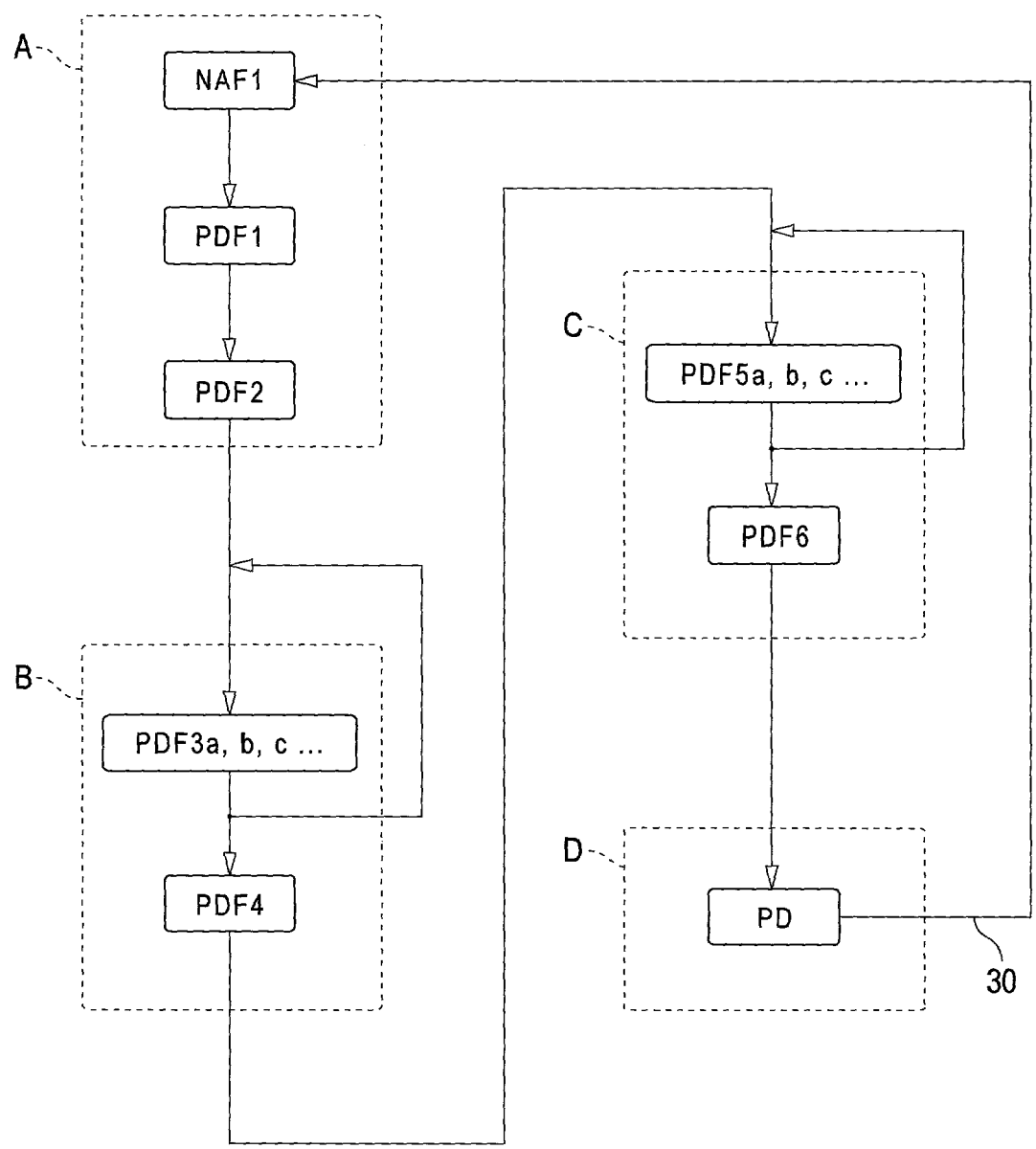
FIG. 3 is a diagram of an ensured workflow edit chain in accordance with an exemplary embodiment of the invention.

Referring now to FIG. 3, there is shown a diagram, similar to the diagram shown in FIG. 1, representing the exemplary electronic publishing workflow edit chain having four stages A-D, as modified per the present invention. It should be understood, however, that the present invention is not limited for use in edit chains with any particular number of stages, and that the edit chan may have less than or more than four stages. In Stage A, after the user has created PDF1, the ensured workflow system may be invoked to create PDF2, such as by using the toolbar, the menu, or shortcut keys, or any method of initiating a software step known in the art. When the user initiates the ensured workflow system for a document that has changes in the document since its last save, pop-up dialog window 20 as shown in FIG. 2A may be displayed. This dialog window advises that the document has been changed and that it needs to be saved before the ensured workflow can be started, and provides the user with the choice of selecting buttons 24 to cancel invocation of the process, or 25 to save the document. The save step is desirable to fix a starting point to which the ensured workflow can track all future changes. In pop-up dialog window 20, the default button 25 ("Save") may be optimized so that the user may proceed with the save merely by hitting the enter key. If the operator chooses button 25 ("Cancel"), the document is not saved and the ensured workflow system is not initiated.

When the user initiates the ensured workflow system for a properly saved document, interactive pop-up window 26 may be displayed. Window 26 provides the user with three data fields 27, 28, and 29 for optional entry of data. In field 27, the user may select one or more original documents. If the user chooses an original document, various parameters to identify the document are stored in the ensured PDF document (to later identify the original document). The original documents may include the native application file document or documents, such as NAF1, from which PDF1 document was generated, and the most important ones on which these documents depend. For example, a user may start with a first QUARK® document having a layout based on a mix of text files and image files and a second QUARK® document based on a placed encapsulated POSTSCRIPT® (EPS) file. If two PDFs based on those QUARK® documents are created and then combined into a single PDF1, the operator may optimally identify only the two QUARK® files as the original documents. The operator does not need to choose the image files that comprise the first QUARK® document, because if one of the images changes, the QUARK® application will ask the user to update the links.

The operator may also select the appropriate preflight profile in data field 28, and provide an optional session comment in data field 29. The preflight profile can be chosen from a database in memory, such as a database associated with a preflighting plug-in such as ENFOCUS PITSTOP™. If a preflight profile is chosen, it is stored in the ensured document for later use in the workflow. When the user selects button 22*d*, PDF1 is then saved as PDF2 comprising the contents of PDF1 along with additional ensured workflow data. The ensured workflow data comprises data typically added to the document file, such as data added to the end of the file comprising information identifying the original document as entered in field 27, the set of rules corresponding to the preflight profile identified in field 28, the session comment added in field 29, a time-date stamp indicating when the file was saved, and a user identification stamp that identifies the user who performed the save.

The ensured workflow data typically includes a marker so that the ensured workflow system can recognize a file containing ensured workflow data as being an ensured document. For example, the data is stored following a one or more specialized keys recognized by the plug-in of the present invention and ignored by other applications. Such a key may include, for example, a prefix. The use of such prefixes is well known in the art, as is the practice of reserving with the developer of a host application one or more prefixes to be used for saving data in the consolidated file for use by only certain plug-in applications. Specifically, for an embodiment of the present invention developed by the assignee, the prefix "FICL" has been reserved for use in ADOBE ACROBAT® PDF files, and any information stored for use by the plug-in of the present invention is stored under a top-level key named "FICL:Enfocus." The present invention is not limited, however, to the use of any particular marker, prefix, or keys.

The ensured workflow data may also include means for determining if the document has been modified outside of the ensured workflow process. Such means may comprise, for example, a checksum of the file, such as a message digest algorithm. A typical such algorithm is known as an MD4 checksum, known in the art and described, for example, in Internet Request for Comments (RFC) 1320 ("The MD4 Message Digest Algorithm", Ronald Rivest, April 1992). Other message digest algorithms may also be used, such as for example the MD2 and MD5 algorithms, which are also well-known in the art. The MD2 algorithm is described in RFC 1319 ("The MD2 Message Digest Algorithm", Burton Kaliski, April 1992) and the MD5 algorithm is described in RFC 1321 ("The MD5 Message Digest Algorithm", Ronald Rivest, April 1992). The invention is not limited to use of any particular message digest algorithm, however, or even a checksum algorithm, and thus may comprise any algorithm known in the art for verifying if a document has been changed. Thus, whenever the ensured workflow system is invoked for a file previously ensured by the system, a comparison of the checksum of the file being opened to the stored checksum in the ensured workflow data is performed. If the checksums do not match, the user is notified, such as with an informational window letting the user know that the changes made in the unensured session will not be logged. The window may be an interactive window that allows the user to add comment data, such as for example to describe the changes that occurred in the unensured session.

Thus, the ensured workflow system enables an operator to intercept and log all modifications to an ensured PDF document. Changes may also be intercepted using a standard "notification" mechanism of the host application. To maximize the number of unensured changes detected, however, and to increase the quality and detail of the edit log, other products in the workflow may provide information that is detected by the ensured workflow software. For example, an editing plug-in may send a message with a meaningful description to the ensured workflow system each time a change is performed by an operator using the editing plug-in. Similarly, stand-alone applications may adhere to the "saving" guidelines used by the ensured plug-in application, and include a human-readable description of any changes made.

The ensured workflow marker is recognized at any step in the ensured workflow system as indicating that the PDF document should be processed by to the ensured workflow system. PDF files without the marker will be treated normally by the host application without initiation of the ensured workflow system. The ensured workflow system may also provide the user an option to generate a unensured copy of the file that does not contain the ensured workflow data.

Returning now to FIG. 3, after saving PDF2, the first user or another user may perform any number of edits, thus creating successive document versions (PDF3*a,b,c* . . . ) each time the document is saved. For example, as soon as PDF2 is created with a chosen preflight profile, the program may display a pop-up dialog window asking if the user wants to perform a preflighting step now or wait until later, providing corresponding buttons for the user to select his choice. The file saved after preflighting file PDF2 (PDF3*a*) contains ensured workflow data corresponding to that preflighting step that can be used for generating a preflight report.

The user may make edits in response to the preflight, or may make edits for any reason whatsoever. Data corresponding to each change made in the document (the "edit log") or each preflighting step conducted is saved at the end of the file as part of the ensured workflow data, so that the exact changes made during each session and the user or department who made the change can be pinpointed. The edits are listed in the edit log in human-readable, natural language such as "Font has been changed" or "Color has been changed to RGB."

A preferred mode of saving documents after edits have been made to the document, is to perform a combination preflight and save operation. Although the user may have the option of saving without preflighting, if the user chooses to save without preflighting, the software may display an pop-up dialog window reminding the user that the document is an ensured document and asking the user to choose whether a "save" or "preflight and save" operation is desired. If the user chooses to preflight and save, an interactive pop-up window may appear showing the preflight profile to be used and allowing the user the opportunity to enter a session comment. If no preflight profile has been associated with the document by the user, the interactive pop-up window may require the user to choose a profile before the preflight and save step can be completed. When the user chooses a preflight profile, the name of that profile and the corresponding parameters of the profile are saved in the consolidated file. During the preflight step, feedback may be provided to the operator via a standard progress bar of the host application or through a separate progress dialog. Each preflight step also preferably comprises comparing the preflight profile stored with the document against any similarly named preflight profiles stored on the user's computer and verifies that the parameters of the preflight profiles are the same. This step prevents miscommunication among different users who, although using a preflight profile by the same name, may actually be using a different set of rules for preflighting.

At the end of Stage B, the PDF document (PDF4) is then provided to the service provider in Stage C for preparation for printing. It should be noted that although the document provided to the service provider in Stage C is designated herein as PDF4, this document may be identical to the last created version of the group consisting of files PDF2 and PDF3$a,b,c$ ..., depending on if any changes were made to the document. The service provider may make subsequent edits and/or preflights, creating new document versions PDF5$a,b,c$ ..., each time the an editing session is concluded. Or, because a document created using the ensured workflow method of this invention is preferably preflighted each time it is saved, the service provider may be able to merely ascertain that the correct preflight profile was used and that the document has not been modified since the last successful preflight. The document leaving Stage C is designated PDF6, but if no changes in the document have been made, the document may be identical to the last created document of the group consisting of files PDF2, PDF3$a,b,c$ ..., and PDF4.

In Stage D, PDF6 is then printed by the printer or electronic publisher, who may comprise the same entity as the service provider, or who may be an unrelated service provider. Prior to printing, the printer may review the document to verify that the correct preflight profile was used. Looping arrow 30 between Stage D and Stage A in FIG. 3 is indicates that the document as printed (PDF6) can be returned to the document originator for checking against the native file application NAF1. The user can then update NAF1 manually, using the edit log of the changes as provided by the software of this invention. The check against the NAF1 will allow the document originator not only to determine what changes were made and by whom, but also to determine if the NAF1 file has changed since the creation of the original PDF1 document. If so, it may be necessary to edit and reprint the PDF file accordingly.

As described above, at the end of each session in the ensured workflow system, the PDF document receives a "stamp" identifying the operator and/or workstation for each session. The combination of these stamps and the edit log described previously makes it possible to pinpoint responsibility for any changes made in the edit chain to having occurred during a specific session conducted by a specific individual or entity. To facilitate this process, the system of this invention may also enable a visual comparison of the page content between any two snapshots of the PDF file created when the file was saved. The user may also create a copy of the PDF file in the same condition that it was saved in any previous snapshot. This makes it possible to "undo" one or more complete sessions at a time. Each line item in the edit log may also be hyperlinked to the corresponding region on a PDF document where the change was made. These operations are described in more detail below.

D. Additional Operations

The software may allow the user to edit the ensured workflow attributes at any time during the session, such as via an interactive pop-up window. For example, the user may change the preflight profile or may change or add a session comment associated with the session. The interactive pop-up window may show the existing profile and any existing comment. A comment may be added by the user at any time during each session. Thus, for example, if the user wants to make sure that he provides a comment for each change as it is made during the session, the user may want to edit the comment after every edit of the document. If the user changes the preflight profile, a dialog window may be generated confirming the change and requiring the user to select whether to perform a preflight now or later. If the user chooses to remove the preflight profile so that no preflight profile is associated with the document, a pop-up dialog window may be provided reminding the user of the benefits of using the preflight profile and asking the user either to OK or cancel the decision to remove the profile.

The software may also allow the user to show a preflight report at any time during the session. If the user requests a preflight report when there have been edits since the last preflight report, a pop-up dialog window may be displayed informing the user that a preflighting step needs to be performed, and asking the user to OK or cancel performing a preflight and save operation. If no edits have been performed since the last preflighting step, the preflight report is generated from the stored ensured workflow data.

The preflight report may have a format similar to those known in the art, such as provided by ENFOCUS PITSTOP PROFESSIONAL™, the user's manual for which is hereby incorporated by reference. Such a preflight report may provide a listing for each problem encountered during preflighting, if any. Each listing may indicate the severity of the problem encountered (a "caution" or an "error"), provide a description of the problem, and may include one or more hyperlinks. Such hyperlinks, when selected, may take the user to the object that is source of the error in the version of the document having been preflighted to generate the report.

The software may also allow the user to show the document status, such as via display of a document status window. The document status window may display data fields showing the preflight profile information (such as the profile name, the author and date), preflight status information, and document status information. If no preflight profile has been designated for the document, the data fields are left blank. Exemplary preflight status information may indicate, for example, that: (a) no ensured preflight profile is attached to the document; (b) the ensured preflight profile cannot be verified because the profile database is not accessible from the operator's computer; (c) the ensured preflight profile matches a profile in the profile database; (d) the ensured preflight profile matches a profile in the profile database, but a different profile with the same name exists in the database; or (e) the ensured preflight profile matches none of the profiles in the profile database. Exemplary document status information may indicate, for example, that: (a) the active document cannot be preflighted because there is no ensured preflight profile associated with the document; (b) the active document has not been preflighted with the preflight profile; (c) the active document has been preflighted with the ensured preflight profile and the preflight report contains errors; or (d) the active document has been preflighted with the ensured preflight profile without errors. In the case where the document has not been preflighted, the window may include a button for the user to choose to preflight and save now, and in the cases where the document has been preflighted, the window may include a button for the user to choose to show the report.

The software may also allow the user to access the edit log for the document, which provides a consolidated report of all the edits performed. The edit log may comprise a new PDF document opened by the host application containing a chronological listing of the sessions for the document and the edits performed in each session. The report may contain a session header for each session, listing the relevant session information, user information, session comment (if any) and status of the document (whether preflighted correctly, edited, etc.). All edits performed in the session may also be listed under the session header. The edit description may include a user-friendly description of the edit that was performed, and citation to the page or pages in the document where the edit was performed.

In front of each edit may be a hyperlink that when selected by the user may link back to the original document and display the page where the change occurred. On the displayed page, all edits that were done in the current session may be highlighted, with edits belonging to the specific item the user selected being highlighted in a different (more prominent), preferably transparent, color. This way the user has information about what changed in a session and information about where a particular edit was made. If the edit was performed on multiple pages (for example using an action list or a global change), the hyperlink may link back to the page where the first instance of the change occurred. When the user changes pages, the edits on those pages may be highlighted as well.

The software may also allow the user to display the history of all sessions in the ensured document. Such a display may include a window listing the type of session (such as "original" to designate the session that created the initial document, or the name of the application or plug-in used to create subsequent versions), the user who worked on the document in each session, and the ending date and time of the session. If the operator selects any of the sessions shown on the list, a session info dialog box may be provided showing all available details for the selected session, such as the operator associated with the session, session comments, and the like. This session info dialog box may be read-only and may comprise two tab-pages. The second tab-page may be a read-only version of the user identification dialog, whereas the first page may contain: (a) the start and end date & time of the session; (b) the session comment; (c) the software product used (i.e., ENSURE PLUG-IN™ 1.0, PITSTOP™ Server 2.34); (d) the product environment (i.e., ACROBAT® 4.05c, ADOBE® PDF Library 4.0); (e) the session profile; and (f) the document state at the end of the session (i.e., unensured, tampered, ensured without preflight, ensured with preflight with errors, ensured with preflight without errors)

The document history display window may also contain an option for the user to compare the state of the document at the end of a selected session with another point in the workflow. The user may be able to select whether he wants to see the comparison provided using the edit log or visually side-by-side. If the user selects to have a visual comparison, a second dialog box showing the list of sessions (identical to the list as in the original document history display) may be provided allowing the user to select a second session to compare with the session selected in the document history window. Once a proper second session has been selected, snapshots belonging to both versions may be opened as temporary files and compared using the standard document comparison functionality of the host application. The document created that compares the two sessions may be saved by the user, if desired.

If the user chooses to see the comparison between sessions using the edit log, the user first selects the second session to be compared to the first session using a second dialog box listing the sessions, and then a window listing the edit log is provided. The edit log window displays a list of all changes that have been stored in the edit log between the first snapshot and the last snapshot (only for the current page). If an item in the edit log window is selected, transparent overlays are generated over the areas on the page in the document where these edits caused a change to the page. The software may allow the user to toggle between the first and last snapshot by using a toggle button, allowing the user to quickly see the changes between the selected sessions.

The edit log navigator may display only the changes for the current page in the active document, so that if the operator goes to another page in the host application, the edit log navigator adjusts the list of edits to match the new page. If an item was selected and the operator switches to another page, that item may be automatically selected again if it is available in the list of edits for that page. If it is not available, no other item is automatically selected for viewing.

The document history display window may also comprise an option to save a snapshot for the end of any of the listed sessions. If the user selects this option, the user is presented with a standard "save as" screen display known in the art directing the user to select the file name and location for saving the snapshot, which is saved as an unensured document.

The software may also allow the user to display a user identification interactive pop-up window. This screen display may list information about the operator to be logged as the user for the current session. Such information may include a window showing the name, department, and contact information (such as telephone number or e-mail address) for the user that is modifiable by the user. The information may also include non-modifiable information, such as registration information regarding to whom (name, company, and registration key) the software is registered and system information as known to the operating system, if available or applicable, such as the username, network name, and/or ethernet or MAC address. This user identification is stored persistently across sessions and it defaults to the registration information where no information is available.

The software may also allow the user to verify the original document (NAF1). If this function is selected, the program may display a list of the original document filenames as stored in the ensured workflow data when the ensured workflow process was started, along with a status (identical, missing, or different) of each document. The program may automatically locate the original files based on the absolute and relative paths that were stored when the original document was added to the list. For example, if the program cannot locate the file using the absolute path, the program may check the relative paths, such as if the original file was the same folder as the PDF document, checking the folder in which the PDF document is now located. The user can browse to select the original document if the file is not found automatically, for example if the path of the original file has been changed.

The program compares information about the selected document with the information about the original document as stored in the ensured document to make the status determination. A file with the same filename and type with a different checksum from the original document will be considered different. The checksums need to match for the documents to be considered identical. Separate checksums are stored for the data and resource forks for computer platform compatibility. Thus, for example, if a certain fork is not relevant for the document type (e.g. a resource fork for a PDF document), the files may be considered identical even though the non-relevant fork may be different.

When the operator chooses the regular "Save" menu item of the host application 7, the operator is warned via the screen display of FIG. 13B that this is not the preferred option for ensured documents (the preferred option is performing a "Preflight and Save").

The ensured workflow system of this invention may be compatible with digital signature software, such as ADOBE DIGITAL SIGNATURES™, which can be used when rigid security and authentication are desired. Before executing a "Sign and Save" command for such digital signatures, however, the ensured workflow system may require the user to first preflight and save the document. Thus, the ensured workflow system may intercept "Sign and Save" commands for ensured workflow documents that have been edited since the last preflight and save step, and display a dialog pop-up window advising the user to save the document using the ensured workflow system first. If the operator chooses to proceed with the "Sign and Save," anyway, the ensured workflow edit log will reflect that an unsecured session was conducted.

When the operator selects "Save As" on the menu of the host application for an ensured document, the user may be prompted with a dialog pop-up window advising that the Save As function will create an unensured copy of the document, and requiring the user to select whether to continue to save the unensured copy or cancel the request. If the user chooses to save the unensured copy," the ensured workflow system removes all ensured workflow data from the document and makes sure the document is saved in a cleaned up configuration.

The exemplary system is described in terms of a combination of a host/plug-in computer application software implementation. This software may be embodied in a carrier such as an integrated circuit, memory card, magnetic or optical disk or an optical, audio-frequency or radio frequency carrier wave. Furthermore, the above program has been described with respect to specific preferred embodiments having various pop-up windows, warnings, and dialogs. Programs within the scope of this invention, however, may have any type of user interface and user command structure known in the art, and may have less than or more than all the specific functions described herein. Moreover, although described herein with respect to an exemplary embodiment in which the various information relating to the document is stored directly as part of the consolidated file, the term "in association with" as used herein refers not only to storing such information in the consolidated file, but also to other means of associating such information with the file, such as in a separate file that is linked to the consolidated file. Although storage directly in the file has certain advantages in the exemplary embodiment, any method of storing information in association with a consolidated file as may be known in the art is contemplated as being within the scope of this invention.

Figure 4:
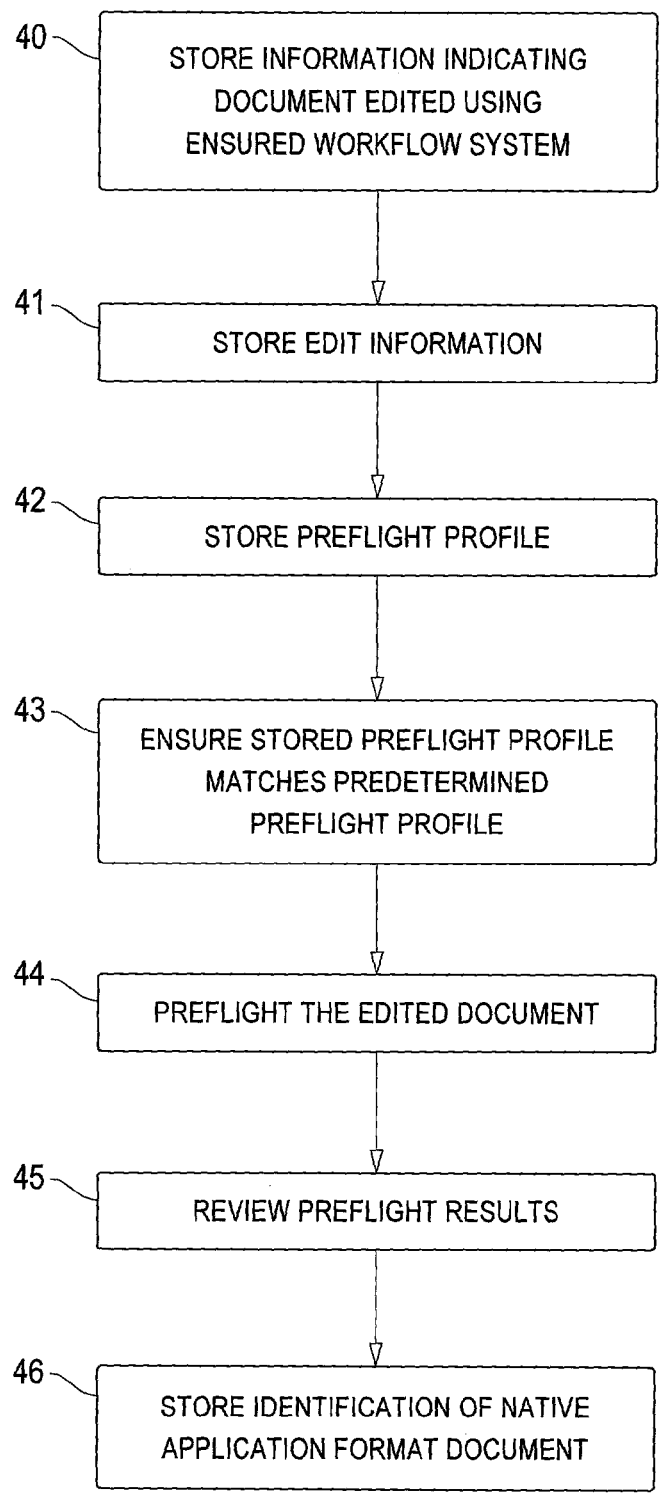
FIG. 4 is a schematic flowchart depicting an exemplary method/functions of exemplary software means of the invention.

In summary, an exemplary method in accordance with the invention may comprise the steps shown in FIG. 4. These steps are not in any particular order, as the steps may be performed in any order depending on the particular needs of the consolidated document being created and modified. Thus, in the embodiment shown in FIG. 4, the ensured workflow method comprises storing, in association with the consolidated document, information that indicates the document was edited using the ensured workflow system, as shown in step 40. As defined here broadly, the "ensured workflow system" may comprise any version of the computer program means of this invention, such as a version 1.0, 2.0, and the like, as such nomenclature is well-known in the software industry. As noted above, the term "storing" as used herein refers to any type of storage in association with the consolidated document, with a preferred embodiment comprising storing the information as part of the consolidated document. The method further comprises storing edit information regarding any changes made to the document, as shown in step 41. In an exemplary method, this step may be repeated each time an edit is made to the document.

The method further comprises storing a preflight profile, as shown in step 42. Step 43 comprises ensuring the stored preflight profile matches a predetermined preflight profile in a database, to make certain that the user is using the correct preflight profile, and to let an end user be sure that all previous preflighting steps were performed against the correct preflight profile. Step 44 comprises preflighting the edited document. In a preferred embodiment, this step may be performed each time an edit step is performed. Step 45 comprises reviewing the results of the preflighting step. This step may be performed any time as desired by the user. Step 46 comprises storing an identification of the native application format document.

Although shown herein with respect to a preferred embodiment comprising all of steps 40-46, versions of the method may be performed with less than all the steps. For example, some embodiments may merely comprise steps 40 and 41; other embodiments may comprise all the steps except step 41. What is important, is that the method allow the user to ensure that a document created by the method of the invention meets the qualifications desired by the user. If the user needs to know the responsibility for each edit made to the document, then the method may comprise only steps 40 and 41. If the user just needs to make sure that the document has been preflighted with a correct preflight profile, than method steps 40, 42, 43, and 44 may be most critical. Other myriad combinations may also be provided. Similarly, an ensured workflow system of the present invention may comprise computer means for performing each of steps 40-46, or only some of the steps as noted above, including a system comprising means for performing all of the functions, in which some or all of the functions are optional at the user's discretion.

Figure 5:
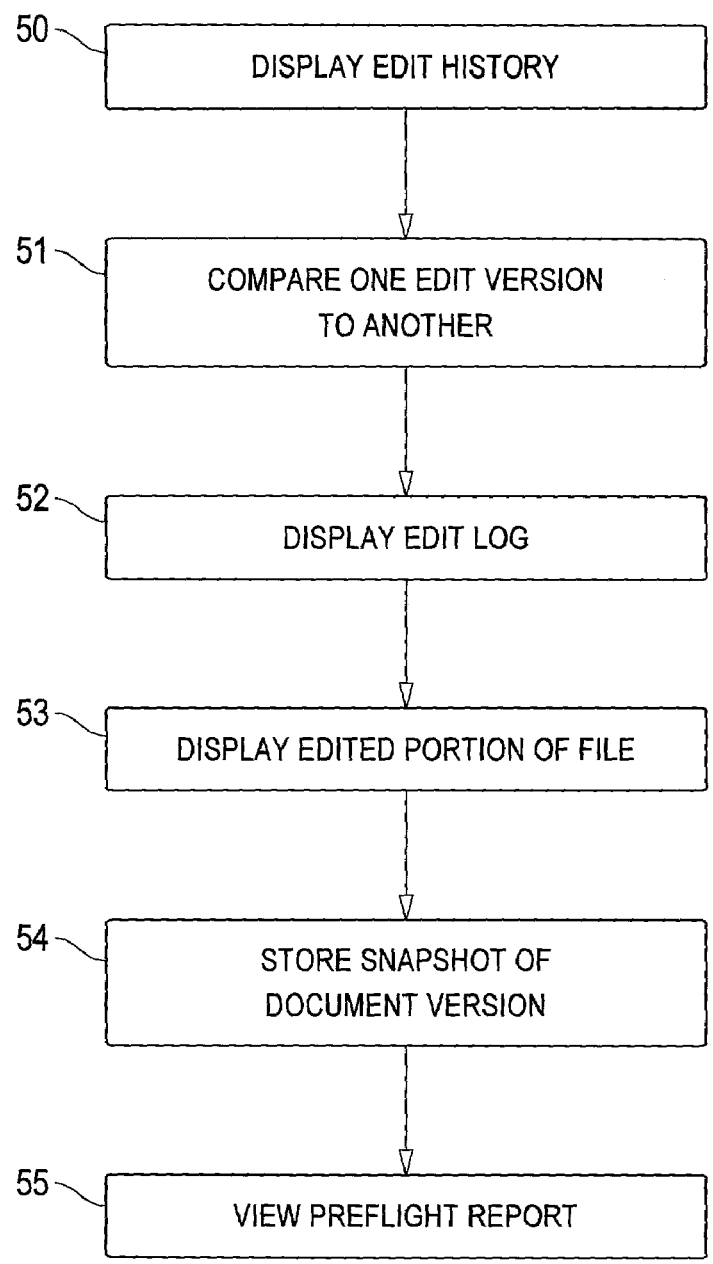
FIG. 5 is another schematic flowchart depicting additional exemplary method steps/functions of exemplary software means of the invention.

The exemplary method/system may further comprise additional steps/computer means. As shown in FIG. 5, an exemplary system may further comprise means 50 for displaying an edit history; means 51 for comparing one edit version of a consolidated document with another edit version, including a visual comparison of the documents side-by-side, such as on a corresponding computer screen; means 52 for displaying an edit log; and means 53 for displaying a portion of the file that has been edited. The system may further comprise means 54 for saving a snapshot of one or more document versions as is at the end of or during a desired time in an editing session, and means 55 for reviewing a structured preflight report comprising an organized presentation of the preflight results. As with the functions shown in FIG. 4, one embodiment may comprise means for performing all of the above functions, while other embodiments may comprise less than all of the means. Exemplary methods may also include all of the steps 50-55, in any order, or less than all of the steps. The computer means may comprise any computer hardware or software means known in the art.

Although illustrated and described above with reference to certain specific embodiments, the present invention is nevertheless not intended to be limited to the details shown. Rather, various modifications may be made in the details within the scope and range of equivalents of the claims and without departing from the spirit of the invention. For example, although the system and method of this invention are particularly useful in the graphic arts field, the invention is applicable to other fields as well, as the invention is not limited to any particular field or fields. Also, although systems and methods are described herein directed to both tracking edit information and preflighting information, systems and/or methods directed to only one of the two functions may also be provided.

What is claimed is:

1. A computer program product, tangibly stored on a computer-readable medium, for editing a consolidated document in one or more editing sessions of an edit chain in which one or more users edit and save successive versions of the consolidated document, the consolidated document comprising at least one component file converted from a native application format into and stored in a non-native application format different from the native application format, the non-native application format comprising a format accepted by an output processing system, the product comprising:

means for storing a marker within the consolidated document, the marker indicating that the document was edited using an ensured workflow system;

means for storing identifying information within the consolidated document sufficient to identify the at least one component file that was converted into the consolidated document, the identifying information comprising one or more of: file name, file type, relative path, absolute path, creation date, modification date, and checksum data; means for storing preflight information within the consolidated document, the preflight information identifying a preflight profile and parameters thereof to be used for preflighting the document;

means for preflighting the edited document in accordance with the preflight profile; and means for storing an edit log within the consolidated document, the edit log comprising edit information corresponding to a history of edits made to the document in each editing session of the edit chain, the edit information comprising: a listing of one or more edits made during the session, user information relating to the user who conducted the edit, comment data optionally entered by the user relating to the session, and one or more preflight results, if preflighting has been performed.

2. The product of claim 1 further comprising means for allowing the one or more users to optionally not store the native application information using the corresponding means, optionally not store the preflight information using the corresponding means, optionally not preflight the edited document, or a combination thereof.

3. The product of claim 1 comprising means for preflighting and saving the document with a single user command.

4. The product of claim 1 wherein the consolidated document comprises a portable document format (PDF) file.

5. The product of claim 4 wherein the product comprises a plug-in application for use with a host application that enables viewing and creation of PDF files and that has an application program interface (API) for integrating the functionality of the plug-in application.

6. The product of claim 5, wherein the identifying information indicating that the document was edited using the product comprises a key comprising a prefix approved by a developer of the host application.

7. The product of claim 1, wherein the product further comprises means for detecting edits which were not made by the product.

8. The product of claim 7, wherein the means for detecting edits not made by the product comprises a checksum.

9. The product of claim 8 wherein the checksum comprises a message digest algorithm selected from a group consisting of MD2, MD4 and MD5.

10. The product of claim 1 further comprising means to display the listing of one or more edits made during the session in an edit log.

11. The product of claim 10 further comprising means for displaying a portion of the edited file in response to the user to selecting a corresponding entry in the edit log.

12. The product of claim 1 further comprising means for displaying a history of editing sessions for the edited file.

13. The product of claim 12 further comprising means for comparing one document version saved after one session with an other document version saved after an other session.

14. The product of claim 13 further comprising means for visually comparing the one version of the document side-by-side with the other version of the document.

15. The product of claim 12 further comprising means for comparing the one version of the document with the other version of the document using an edit log listing all the edits made between the one version and the other version.

16. The product of claim 15 further comprising means for displaying a portion of the edited file in response to the user to selecting a corresponding entry in the edit log.

17. The product of claim 1 further comprising means for saving a snapshot of a previous document version saved after a selected editing session.

18. The product of claim 1 further comprising means for reviewing an identifier of the preflight profile stored within the document, reviewing whether the preflight profile stored within the document matches a database preflight profile, reviewing whether the document has been preflighted with the preflight profile stored within the document, and reviewing whether the preflight results indicate any errors in the document.

19. The product of claim 18 further comprising means for reviewing a preflight report.

20. The product of claim 1 wherein each means for storing information is adapted to store the corresponding information as part of the consolidated document file.

21. The product of claim 1, wherein the product comprises a stand-alone application.

22. The product of claim 1, wherein the product comprises a library file.

23. The product of claim 1 further comprising means for verifying parameters of a preflight profile stored in a user's memory device with the parameters of the preflight profile stored in association with the consolidated document.

24. The computer program product of claim 1, further comprising means for visually indicating a status of the consolidated document.

25. The computer program product of claim 24, wherein the status of the consolidated document comprises a status in which the document has been successfully preflighted without errors.

26. The computer program product of claim 25, wherein the status further comprises the preflight profile stored within the document matching a corresponding preflight profile in a profile database.

27. The computer program product of claim 24, wherein the means for visually indicating the status comprises a colored indicator wherein a first color indicates a first status and a second color indicates a second status.

28. A computer program product, tangibly stored on a computer-readable medium, the product comprising a plug-in application for use with a host application for editing a PDF file in one or more editing sessions of an edit chain in which one or more users edit and save successive versions of the PDF file, the PDF file comprising at least one component file converted from a native-application, non-PDF format into and stored in PDF format, the product comprising:
  means for storing a marker within the PDF file indicating that the PDF file was edited using the ensured workflow system;
  means for optionally storing information within the PDF file identifying the at least one component file converted from the native-application, non-PDF format into the PDF format, the identifying information comprising one or more of: file name, file type, relative path, absolute path, creation date, modification date, and checksum data; and
  means for optionally storing a preflight profile within the PDF file to be used for preflighting the document;
  means for optionally preflighting the edited PDF file in accordance with the preflight profile;
  means for storing an edit log within the PDF, the edit log comprising edit information corresponding to a history of edits made to the document in each editing session of the edit chain, the edit information comprising: an edit log listing of one or more edits made during the session, user information relating to the user who conducted the edit, comment data optionally entered by the user relating to the session, and one or more preflight results, if preflighting has been performed;
  means for displaying the history of edits for the edited PDF file, including means for comparing a first document version saved after a first session with a second document version saved after a second session; and
  means for saving a snapshot of a previous document version saved after a selected editing session; and
  means for reviewing the preflight profile stored within the PDF file, reviewing whether the preflight profile stored within the PDF file matches a database preflight profile having an identical name, reviewing whether the PDF file has been preflighted with the preflight profile stored within the PDF file, and reviewing whether the preflight results indicate any errors in the PDF file.

29. The computer program product of claim 28, further comprising means for visually indicating a status of the consolidated document.

30. The computer program product of claim 29, wherein the status of the consolidated document comprises a status in which the document has been successfully preflighted without errors.

31. The computer program product of claim 30, wherein the status further comprises the preflight profile stored within the document matching a corresponding preflight profile in a profile database.

32. The computer program product of claim 29, wherein the means for visually indicating the status comprises a colored indicator wherein a first color indicates a first status and a second color indicates a second status.

33. A computer-implemented method for verifying responsibility for edits made to a consolidated document in one or more editing sessions of an edit chain in which one or more users edit and save successive versions of the consolidated document using an ensured workflow software program embodied on a computer readable medium, the consolidated document comprising at least one component file converted from a native application format into and stored in a non-native application format different from the native application format, the non-native application format comprising a format accepted by an output processing system, the method comprising the steps of:
  (a) storing a marker within the consolidated document indicating the at the document was edited using the ensured workflow software package;
  (b) storing an edit log within the consolidated document, the edit log comprising edit information corresponding to a history of edits made to the document in each editing session of the edit chain, the edit information comprising: a listing of one or more edits made during the session, user information relating to the user who conducted the edit, any comments entered by the user relating to the session, and one or more preflight results, if preflighting has been performed;
  (c) storing identifying information within the consolidated document sufficient to identify the at least one component file that was converted into the consolidated document, the identifying information comprising one or more of: file name, file type, relative path, absolute path, creation date, modification date, and checksum data; and
  (d) storing a preflight profile within the consolidated document to be used for preflighting the document;
  (e) preflighting the edited document in accordance with the preflight profile and storing one or more preflight results related to the preflighting step as edit information in the edit log.

* * * * *